(12) United States Patent
Park et al.

(10) Patent No.: US 11,496,469 B2
(45) Date of Patent: Nov. 8, 2022

(54) APPARATUS AND METHOD FOR REGISTERING BIOMETRIC INFORMATION, APPARATUS AND METHOD FOR BIOMETRIC AUTHENTICATION

(71) Applicant: SAMSUNG SDS CO., LTD., Seoul (KR)

(72) Inventors: Hyun Chul Park, Seoul (KR); Dong Yeong Kim, Seoul (KR); Kyung Joon Park, Seoul (KR); Hee Jin Park, Seoul (KR); Hyo Il Lee, Seoul (KR); Jae Hyuk Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 203 days.

(21) Appl. No.: 16/887,251

(22) Filed: May 29, 2020

(65) Prior Publication Data
US 2020/0382494 A1 Dec. 3, 2020

(30) Foreign Application Priority Data

May 29, 2019 (KR) .................. 10-2019-0062938

(51) Int. Cl.
*H04L 9/40* (2022.01)
*G06F 21/45* (2013.01)
*H04L 9/06* (2006.01)
*H04L 9/32* (2006.01)
*H04W 12/06* (2021.01)

(52) U.S. Cl.
CPC .......... *H04L 63/0861* (2013.01); *G06F 21/45* (2013.01); *H04L 9/0643* (2013.01);
(Continued)

(58) Field of Classification Search
CPC ............. H04L 63/0861; H04L 63/0428; H04L 9/0643; H04L 9/3231; H04L 9/3247; H04L 9/0428; H04W 12/06
(Continued)

(56) References Cited

U.S. PATENT DOCUMENTS 4,972,476 A * 11/1990 Nathans .............. G06V 40/168
380/54
5,229,764 A * 7/1993 Matchett ............. H04W 12/126
340/5.74
(Continued)

FOREIGN PATENT DOCUMENTS

EP        3439230 A1     2/2019
KR    10-1622253 B1     5/2016

OTHER PUBLICATIONS

European Search Report For EP 20177064.1 dated Oct. 1, 2020 from European patent office in a counterpart European patent application.

*Primary Examiner* — Dant B Shaifer Harriman
(74) *Attorney, Agent, or Firm* — The PL Law Group, PLLC (57) ABSTRACT

A method of registering biometric information according to an embodiment includes generating a registration target biometric template based on biometric information of a user, transmitting a biometric information registration request including the registration target biometric template to a server, acquiring transaction information based on the biometric information registration request from the server through one or more communication interfaces, generating an electronic signature for the transaction information using a private key, transmitting the electronic signature for the transaction information to the server through the one or more communication interfaces, and acquiring a registration result for the registration target biometric template based on a verification result for the electronic signature from the server through the one or more communication interface.

14 Claims, 9 Drawing Sheets

(52) U.S. Cl.
CPC .......... *H04L 9/3231* (2013.01); *H04L 9/3247* (2013.01); *H04L 63/0428* (2013.01); *H04W 12/06* (2013.01); *G06F 2221/2117* (2013.01)

(58) Field of Classification Search
USPC ........................................................ 713/176
See application file for complete search history.

(56) References Cited

U.S. PATENT DOCUMENTS

| | | | | |
|---|---|---|---|---|
| 5,280,527 | A * | 1/1994 | Gullman | G07C 9/29 |
| | | | | 713/184 |
| 5,790,668 | A * | 8/1998 | Tomko | G07C 9/27 |
| | | | | 713/186 |
| 5,991,408 | A * | 11/1999 | Pearson | H04L 9/3231 |
| | | | | 382/116 |
| 5,995,630 | A * | 11/1999 | Borza | G07C 9/37 |
| | | | | 380/278 |
| 9,471,765 | B1 * | 10/2016 | Setterberg | G06V 10/772 |
| 10,237,270 | B2 * | 3/2019 | Farrell | H04L 9/32 |
| 2002/0056043 | A1 | 5/2002 | Glass | |
| 2006/0282671 | A1 * | 12/2006 | Burton | G16H 10/60 |
| | | | | 713/176 |
| 2015/0312041 | A1 | 10/2015 | Choi | |
| 2016/0063235 | A1 * | 3/2016 | Tussy | H04W 12/06 |
| | | | | 726/6 |
| 2016/0219046 | A1 * | 7/2016 | Ballard | H04L 63/0861 |
| 2017/0264429 | A1 * | 9/2017 | Ahn | H04L 9/08 |
| 2018/0091505 | A1 * | 3/2018 | Farrell | H04L 63/062 |
| 2019/0370441 | A1 * | 12/2019 | Eldefrawy | H04L 9/3231 |

* cited by examiner

APPARATUS AND METHOD FOR REGISTERING BIOMETRIC INFORMATION, APPARATUS AND METHOD FOR BIOMETRIC AUTHENTICATION

CROSS-REFERENCE TO RELATED APPLICATION (S)

This application claims the benefit under 35 USC § 119(a) of Korean Patent Application No. 10-2019-0062938, filed on May 29, 2019, in the Korean Intellectual Property Office, the entire disclosure of which is incorporated herein by reference for all purposes.

BACKGROUND

1. Field

Disclosed embodiments relate to biometric information registration technology and biometric authentication technology.

2. Description of Related Art

A conventional server-based user biometric authentication method stores biometric information of a user in a server, and acquires the biometric information of the user from a terminal and transmits the biometric information to the server each time biometric authentication is performed. Thereafter, the server performs biometric authentication by matching the biometric information received from the terminal with pre-stored biometric information.

Therefore, the conventional technology has a problem in that when the server fails to match the biometric information, the terminal must acquire the biometric information again and transmit it to the server.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide an apparatus for registering biometric information and an apparatus and method for biometric authentication.

In an embodiment, there is provided an apparatus for registering biometric information including one or more processors, and one or more communication interfaces, wherein the one or more processors are configured to generate a registration target biometric template based on biometric information of a user, transmit a biometric information registration request including the registration target biometric template to a server through the one or more communication interfaces, acquire transaction information based on the biometric information registration request from the server through the one or more communication interfaces, generate an electronic signature for the transaction information using a private key, transmit the electronic signature for the transaction information to the server through the one or more communication interfaces, and acquire a registration result for the registration target biometric template based on a verification result for the electronic signature from the server through the one or more communication interface.

The one or more processors may generate ciphertext for the registration target biometric template using identification information of the user and transmit the biometric information registration request including the ciphertext to the server through the one or more communication interfaces.

The transaction information may include hash information and random character information for the registration target biometric template.

The registration result may be determined based on the verification result of the server for the electronic signature using a public key that corresponds to the private key.

In another embodiment, there is provided a method of registering biometric information including generating a registration target biometric template based on biometric information of a user, transmitting a biometric information registration request including the registration target biometric template to a server, acquiring transaction information based on the biometric information registration request from the server through one or more communication interfaces, generating an electronic signature for the transaction information using a private key, transmitting the electronic signature for the transaction information to the server through the one or more communication interfaces, and acquiring a registration result for the registration target biometric template based on a verification result for the electronic signature from the server through the one or more communication interface.

The transmitting of the biometric information registration request may include generating ciphertext for the registration target biometric template using identification information of the user and transmitting the biometric information registration request including the ciphertext to the server through the one or more communication interfaces.

The transaction information may include hash information and random character information for the registration target biometric template.

The registration result may be determined based on the verification result of the server for the electronic signature using a public key that corresponds to the private key.

In still another embodiment, there is provided an apparatus for biometric authentication including one or more processors and one or more communication interfaces, wherein the one or more processors are configured to request a server to authenticate a user through the one or more communication interfaces, acquire a registered biometric template of the user from the server, which has pre-registered the biometric template, through the one or more communication interfaces, generate an authentication target biometric template based on biometric information of the user, perform biometric information matching based on the registered biometric template and the authentication target biometric template, transmit a biometric information matching result to the server through the one or more communication interfaces, and acquire an authentication result for the user based on the biometric information matching result from the server through the one or more communication interfaces.

The one or more processors may acquire ciphertext for the registered biometric template, which is encrypted using identification information of the user, from the server through the one or more communication interfaces and acquire the registered biometric template by decrypting the ciphertext using the identification information.

The one or more processors may acquire transaction information from the server through the one or more communication interfaces.

The transaction information may include hash information and random character information for the registered biometric template.

The one or more processors may generate an electronic signature for the transaction information and the biometric information matching result using a private key and transmit the biometric information matching result and the electronic signature to the server through the one or more communication interfaces.

The authentication result may be determined based on a verification result of the server for the electronic signature using a public key that corresponds to the private key.

In yet another embodiment, there is provided a method of biometric authentication including requesting a server to authenticate a user, acquiring a registered biometric template of the user from the server, which has pre-registered the biometric template, generating an authentication target biometric template based on biometric information of the user, performing biometric information matching based on the registered biometric template and the authentication target biometric template, transmitting a biometric information matching result to the server, and acquiring an authentication result for the user based on the biometric information matching result from the server.

The acquiring of the registered biometric template may include acquiring ciphertext for the registered biometric template, which is encrypted using identification information of the user, from the server and acquiring the registered biometric template by decrypting the ciphertext using the identification information.

The method may further include acquiring transaction information from the server.

The transaction information may include hash information and random character information for the registered biometric template.

The transmitting of the biometric information matching result may include generating an electronic signature for the transaction information and the biometric information matching result using a private key and transmitting the biometric information matching result and the electronic signature to the server.

The authentication result may be determined based on a verification result of the server for the electronic signature using a public key that corresponds to the private key.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
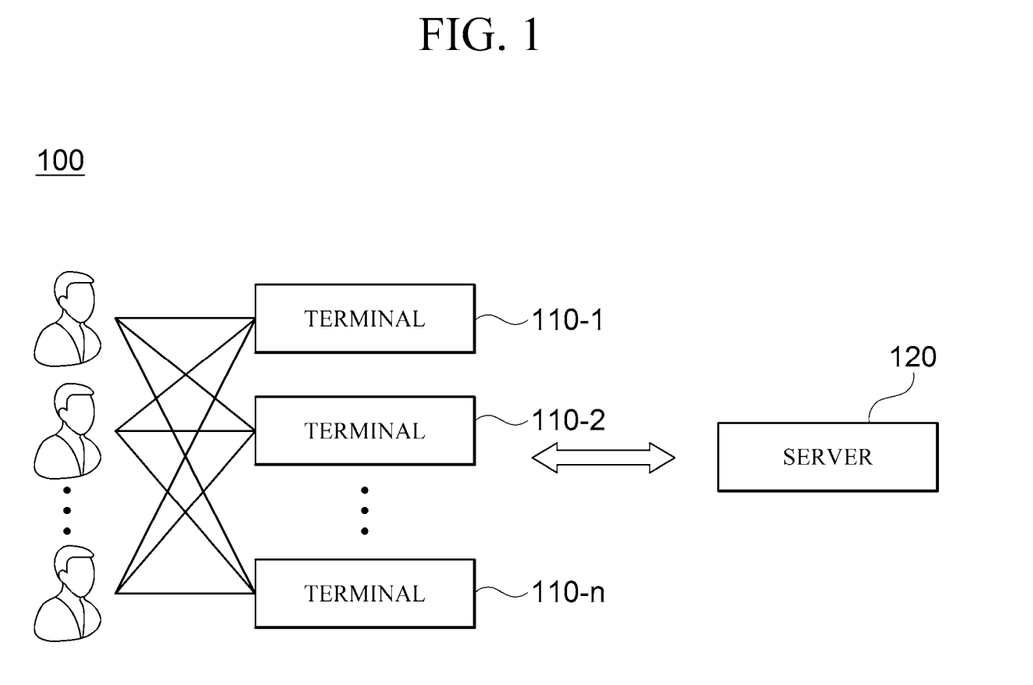
FIG. 1 is a diagram illustrating a configuration of a biometric authentication system according to one embodiment.

FIG. 1 is a block diagram illustrating a configuration of a biometric authentication system 100 according to one embodiment.

Referring to FIG. 1, the biometric authentication system 100 includes a plurality of terminals 110-1, 110-2, 110-n, and a server 120.

According to one embodiment, the biometric authentication system 100 may register biometric information of a user using the plurality of terminals 110-1, 110-2, and 110-n and the server 120, which is connected to each of the terminals 110-1, 110-2, and 110-n through a wired or wireless network, and may provide biometric authentication information to the user by authenticating the user using the registered biometric information. In this case, the biometric information may be information regarding unique characteristics of an individual, such as a face, fingerprints, voice, iris, veins, blood vessels, electrocardiogram, electroencephalogram, pulse, blood pressure, and the like.

Each of the terminals 110-1, 110-2, and 110-n may be a device that provides biometric authentication information to a user in association with the server 120 through a wired or wireless network. In this case, each of the terminals 110-1, 110-2, and 110-n may be a common terminal used by a plurality of users for receiving a biometric authentication service.

Each of the terminals 110-1, 110-2, and 110-n may include various types of devices, such as a smartphone, a tablet personal computer (PC), and the like, but is not limited thereto, and may include various other types of devices that each include a display means, an input/output means, an information processing means, and a communication means through a wired or wireless network.

According to one embodiment, each of the terminals 110-1, 110-2, and 110-n may acquire biometric information of the user through one or more input devices, including various types of biometric recognition sensors, such as a camera, a fingerprint recognition sensor, and the like. In this case, the biometric information acquired by each of the terminals 110-1, 110-2, and 110-n may be transmitted to the server 120 for pre-registration or used for biometric information matching. In addition, each of the terminals 110-1, 110-2, and 110-n may acquire a variety of information of the user, such as user information, identification information, personal identification number (PIN), target authentication target transaction details, and the like.

Additionally, according to one embodiment, each of the terminals 110-1, 110-2, and 110-n may generate a private key and a public key of each terminal 110-1, 110-2, and 110-n according to a key generation method of a public key-based encryption algorithm. In this case, each of the terminals 110-1, 110-2, and 110-n may safely store the private key and provide the public key to the server 120.

The server 120 may be a device that registers and manages biometric information of the user and authenticates the user based on the biometric information matching result obtained from each terminal 110-1, 110-2, and 110-n.

In addition, the server 120 may store and manage information regarding the terminal, such as terminal information of the terminal registered through terminal authentication and a public key of the registered terminal, and information regarding the user, such as ciphertext for a user's private key, a user's public key, and user information, in addition to the biometric information of the user.

Meanwhile, since the server 120 transmits the biometric information to the terminal for a biometric authentication service and receives the biometric information matching result from the terminal, the server 120 must have reliability for the corresponding terminal. Hence, the server 120 may authenticate a terminal to perform a biometric authentication service and register the authenticated terminal. For example, the server 120 may authenticate the terminal to perform a biometric authentication service by receiving and storing a public key of the corresponding terminal. Accordingly, the server 120 may deliver the biometric information of the user only to the registered terminal, thereby increasing the security of the biometric authentication service.

Figure 2:
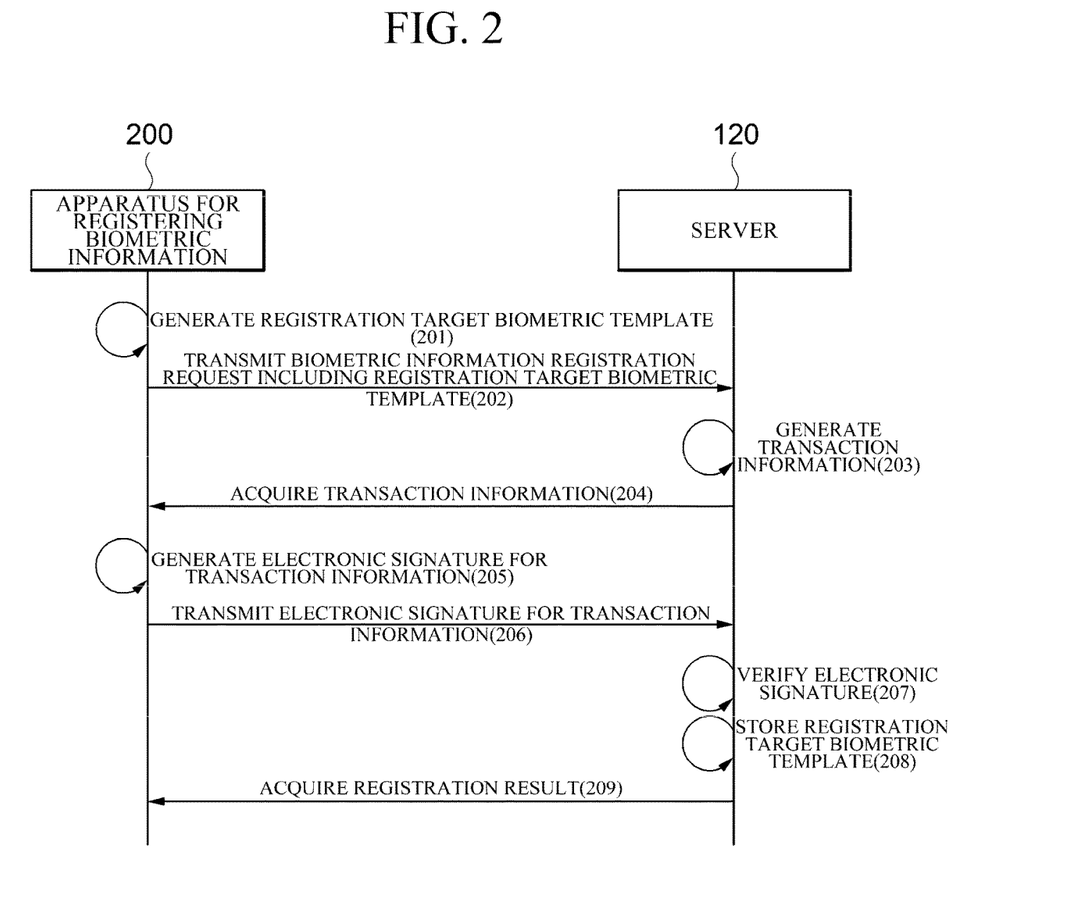
FIG. 2 is a flowchart illustrating a method of registering biometric information according to one embodiment.

FIG. 2 is a flowchart illustrating a method of registering biometric information according to one embodiment.

The method illustrated in FIG. 2 may be performed, for example, by the biometric authentication system 100 illustrated in FIG. 1. In this case, an apparatus 200 for registering biometric information in the example illustrated in FIG. 2 may be, for example, each terminal 110-1, 110-2, and 110-n shown in FIG. 1 or may be implemented as one configuration of each terminal 110-1, 110-2, and 110-n.

Referring to FIG. 2, the apparatus 200 for registering biometric information generates a registration target biometric template based on biometric information of a user. In this case, the biometric template refers to information registered or stored by extracting biometric features.

Specifically, the apparatus 200 for registering biometric information may generate a registration target biometric template by extracting biometric features to be used for biometric information matching from biometric information acquired from a user.

According to one embodiment, the apparatus 200 for registering biometric information may use identification information of the user to generate ciphertext for the registration target biometric template. In this case, the user's identification information may be, for example, an ID of the user.

The apparatus 200 for registering biometric information may generate ciphertext for the registration target biometric template using a symmetric key-based encryption algorithm, such as an advanced encryption standard (AES) algorithm, a data encryption standard (DES) algorithm, or the like, in which an encryption key for encrypting plaintext is the same as a decryption key of ciphertext encrypted using the corresponding encryption key.

Thereafter, the apparatus 200 for registering biometric information transmits a biometric information registration request including the registration target biometric template to the server 120 (202).

According to one embodiment, the apparatus 200 for registering biometric information may transmit a biometric information registration request including ciphertext for the registration target biometric template to the server 120.

Meanwhile, according to one embodiment, the biometric information registration request may further include information on the apparatus for registering biometric information and user information. In this case, the server 120 may check whether a pre-registered biometric template of the user is present based on the information on the apparatus for registering biometric information and the user information which are transmitted from the apparatus 200 for registering biometric information. Thereafter, the server 120 may transmit information on whether biometric information is registered to the apparatus 200 for registering biometric information. For example, when the biometric template of the user is already registered in the server 120, the server 120 may transmit information indicating that the registered biometric template of the user is present to the apparatus 200 for registering biometric information. Alternatively, when the biometric template of the user is not registered in the server 120, the server 120 may continue to perform biometric information registration procedures, which will be described below.

As described above, it is possible to reduce the amount of computation and resource consumption of the apparatus 200 for registering biometric information and the server 120 for biometric authentication service by checking whether biometric information is registered based on the information on the apparatus for registering biometric information and the user information.

Thereafter, the server 120 may generate transaction information based on the biometric information registration request (203).

According to one embodiment, the transaction information may include hash information and random character information for the registration target biometric template. In this case, the random character information refers to data that is randomly generated each time the server 120 generates and transmits transaction information. That is, the random character information may be randomly generated for each registration procedure or authentication procedure, and thus may be information for preventing reuse of a biometric information registration request or the user authentication request.

The server 120 may perform a verification procedure based on random character information using an authentication scheme, such as, for example, a one time challenge (OTC) algorithm. Specifically, each time the server 120 generates and transmits the transaction information, the server 120 may add random character information to the transaction information and transmit the transaction information to the apparatus 200 for registering biometric information. Then, the server 120 may verify an electronic signature for the transaction information received from the apparatus 200 for registering biometric information and check whether the random character information is identical.

Further, according to an embodiment, the transaction information may further include the information on the apparatus for registering biometric information and the user information.

Thereafter, the apparatus 200 for registering biometric information acquires the transaction information based on the biometric information registration request from the server 120 (204).

Then, the apparatus 200 for registering biometric information generates an electronic signature for the transaction information using a private key (205). In this case, the private key may be, for example, a private key of the apparatus 200, which is generated by the apparatus 200 according to a key generation method of a public key-based encryption algorithm.

Thereafter, the apparatus 200 for registering biometric information transmits the electronic signature for the transaction information to the server 120 (206).

Then, the server 120 may verify the electronic signature for the transaction information using a public key (207). In this case, the public key may be, for example, a public key of the apparatus 200, which is generated by the apparatus 200 according to a key generation method of a public key-based encryption algorithm.

That is, the apparatus 200 for registering biometric information and the server 120 generate and verify the electronic signature for the transaction information by using the private key and the public key of the apparatus 200, respectively, thereby verifying the apparatus 200 and the validity of the registration target biometric template, which is transmitted from the apparatus 200 for registering biometric information.

Thereafter, when the electronic signature for the transaction information is verified, the server 120 may store the registration target biometric template (208). For example, the server 120 may or may not store the registration target biometric template based on the success or failure of the electronic signature verification using the public key of the apparatus 200 for registering biometric information. Specifically, when the electronic signature verification is successful, the server 120 may store the registration target biometric template, and when the electronic signature verification fails, the server 120 may not store the registration target biometric template.

According to one embodiment, the server 120 may store ciphertext for the registration target biometric template. Specifically, the server 120 may safely store the biometric information of the user by storing the ciphertext for the registration target biometric template.

Subsequently, the apparatus 200 for registering biometric information acquires the registration result for the registration target biometric template based on the verification result of the electronic signature for the transaction information from the server 120 (209).

According to one embodiment, the registration result for the registration target biometric template may be determined based on the verification result of the server 120 for the electronic signature using the public key that corresponds to the private key.

Figure 3:
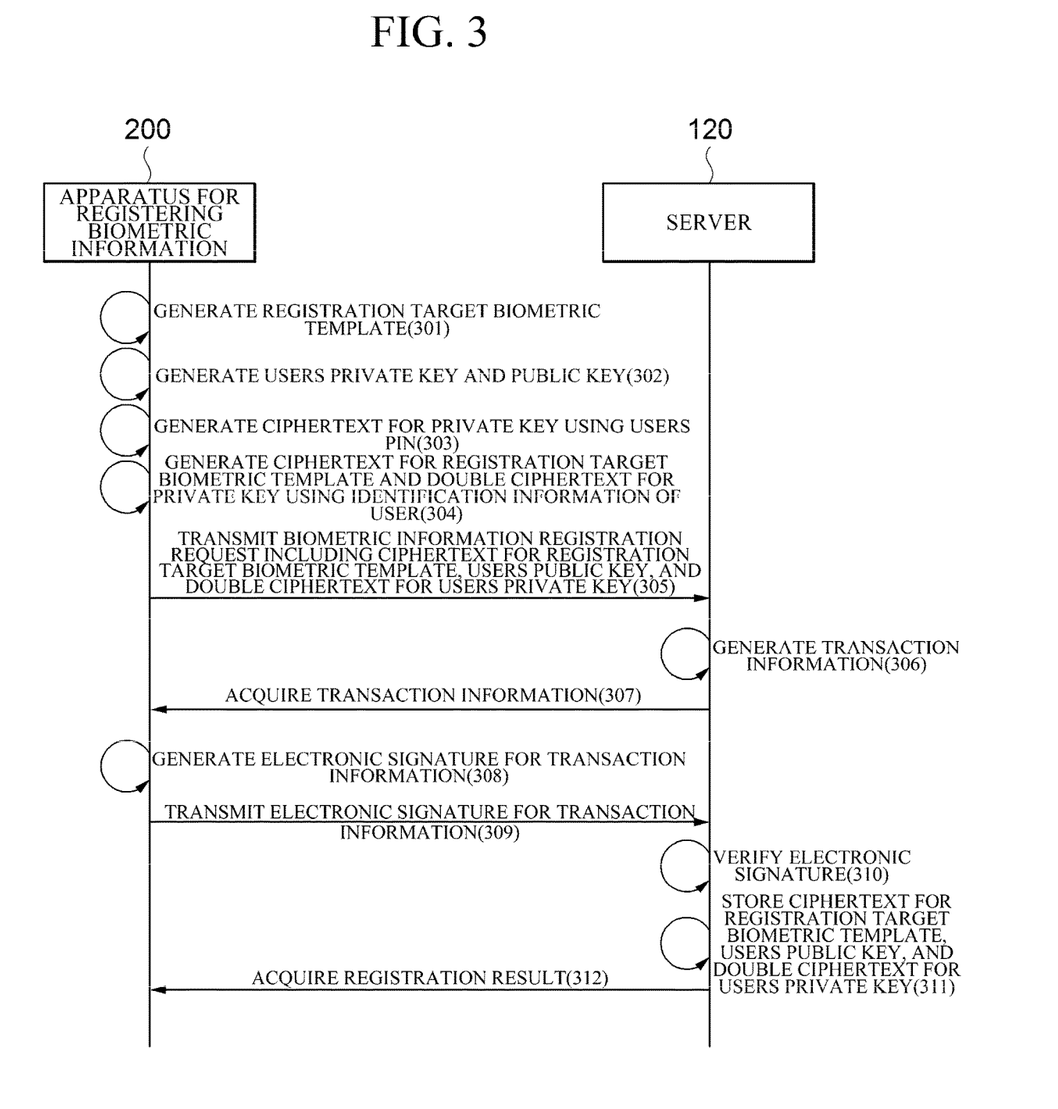
FIG. 3 is a flowchart illustrating a method of registering biometric information for transaction authentication according to one embodiment.

FIG. 3 is a flowchart illustrating a method of registering biometric information for transaction authentication according to one embodiment.

The method illustrated in FIG. 3 may be performed, for example, by the biometric authentication system 100 illustrated in FIG. 1.

Referring to FIG. 3, the apparatus 200 for registering biometric information generates a registration target biometric template based on biometric information of a user (301).

Thereafter, according to one embodiment, the apparatus 200 for registering biometric information may generate a private key and a public key of the user according to a key generation method of a public key-based encryption algorithm (302).

Then, according to one embodiment, the apparatus 200 for registering biometric information may generate ciphertext for the user's private key using the user's PIN (303).

Thereafter, according to one embodiment, the apparatus 200 for generating biometric information may generate ciphertext for the registration target biometric template and double ciphertext for the user's private key using the user's identification information (304).

Specifically, the apparatus 200 for registering biometric information may generate the double ciphertext for the private key by encrypting the ciphertext for the private key once more using the user's identification information.

Subsequently, according to one embodiment, the apparatus 200 for registering biometric information may transmit a biometric information registration request including the ciphertext for the registration target biometric template, the user's public key, and the double ciphertext for the user's private key to the server 120 (305).

Then, the server 120 may generate transaction information based on the biometric information registration request (306).

Thereafter, the apparatus 200 for registering biometric information acquires transaction information based on the biometric information registration request from the server 120 (307).

Then, the apparatus 200 for registering biometric information generates an electronic signature for the transaction information using a private key of the apparatus 200 for registering biometric information (308).

Then, the apparatus 200 for registering biometric information transmits the electronic signature for the transaction information to the server 120 (309).

Thereafter, the server 120 may verify the electronic signature for the transaction information using the public key of the apparatus 200 for registering biometric information (310).

Then, the server 120 may store the ciphertext for the registration target biometric template, the user's public key, and the double ciphertext for the user's private key (311).

Thereafter, the apparatus 200 for registering biometric information acquires the registration result for the registration target biometric template based on the verification result for the electronic signature for the transaction information from the server 120 (312).

Figure 4:
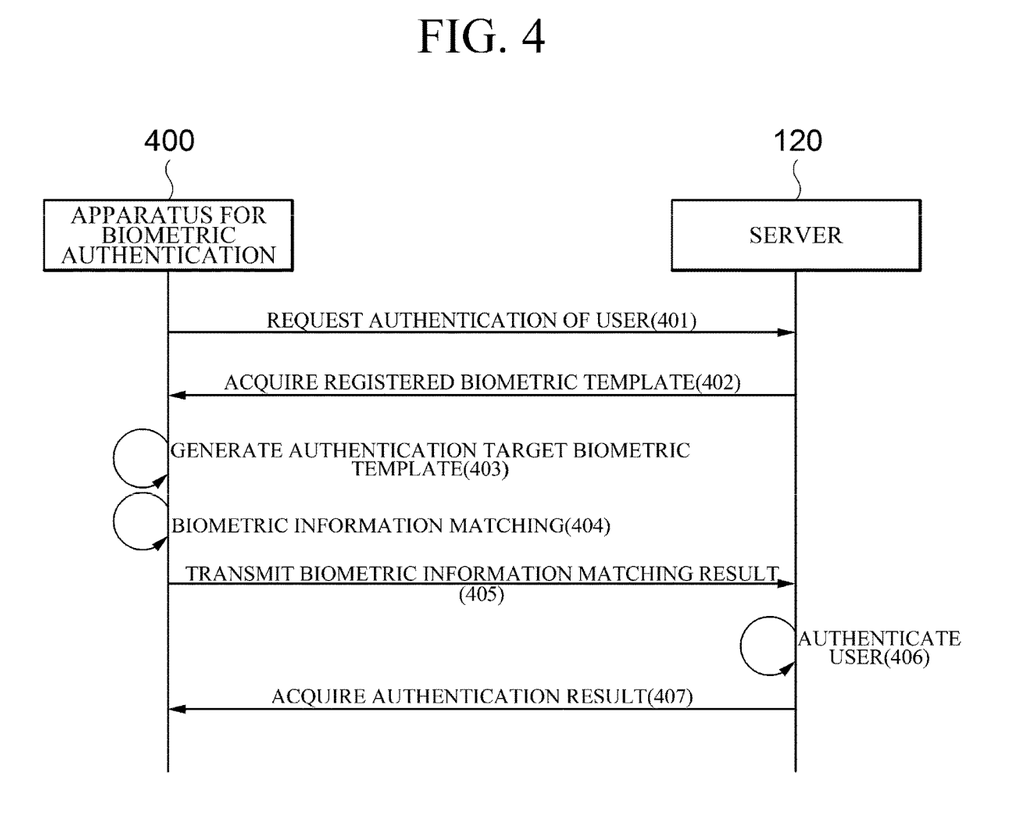
FIG. 4 is a flowchart illustrating a method of biometric authentication according to one embodiment.

FIG. 4 is a flowchart illustrating a method of biometric authentication according to one embodiment.

The method illustrated in FIG. 4 may be performed, for example, by the biometric authentication system 100 illustrated in FIG. 1. In this case, an apparatus 400 for biometric authentication illustrated in FIG. 4 may be, for example, each terminal 110-1, 110-2, and 110-*n* illustrated in FIG. 1, or implemented as one configuration of each terminal 110-1, 110-2, and 110-*n*.

Referring to FIG. 4, the apparatus 400 for biometric authentication requests the server 120 to authenticate a user (401).

Thereafter, the apparatus 400 for biometric authentication acquires a pre-registered biometric template of a user from the server 120 (402).

According to one embodiment, the server 120 may search for the user's registered biometric template to be authenticated based on a request of the apparatus 400. In this case, when the user's registered biometric template is found, the apparatus 400 for biometric authentication may acquire the found registered biometric template from the server 120. On the contrary, when the user's registered biometric template is not found, the apparatus 400 for biometric authentication may stop the biometric authentication procedure and request the user to perform a biometric information registration procedure.

Then, the apparatus 400 for biometric authentication acquires an authentication target biometric template based on the biometric information of the user (403).

Thereafter, the apparatus 400 for biometric authentication performs biometric information matching based on the registered biometric template and the authentication target biometric template (404).

Specifically, the apparatus 400 for biometric authentication may compare the registered biometric template and the authentication target biometric template and determine whether the registered biometric template and the authentication target biometric template are biometric information for the same user. For example, the apparatus 400 for biometric authentication may determine similarity between the registered biometric template and the authentication target biometric template. In this case, when the determined similarity is greater than or equal to a preset value, the apparatus 400 for biometric authentication may determine that the registered biometric template and the authentication target biometric template are information that match each other.

Meanwhile, in the above-described example, the method of matching biometric information is illustrated as using the similarity determination between the registered biometric template and the authentication target biometric template, but is not limited thereto, and the method of matching biometric information may be performed through various known methods.

Thereafter, the apparatus 400 for biometric authentication transmits the biometric information matching result to the server 120 (405).

Thereafter, the server 120 may authenticate the user based on the biometric information matching result (406).

For example, the server 120 may verify whether the biometric information matching has performed by a reliable apparatus 400 for biometric authentication. When the biometric information matching result is verified, the server 120 may or may not authenticate the user based on the success or failure of the biometric information matching. Specifically, when the biometric information matching is successful, the server 120 may authenticate the user, and when the biometric information matching fails, the server 120 may not authenticate the user.

Thereafter, the apparatus 400 for biometric authentication acquires the authentication result for the user based on the biometric information matching result from the server 120 (407).

Figure 5:
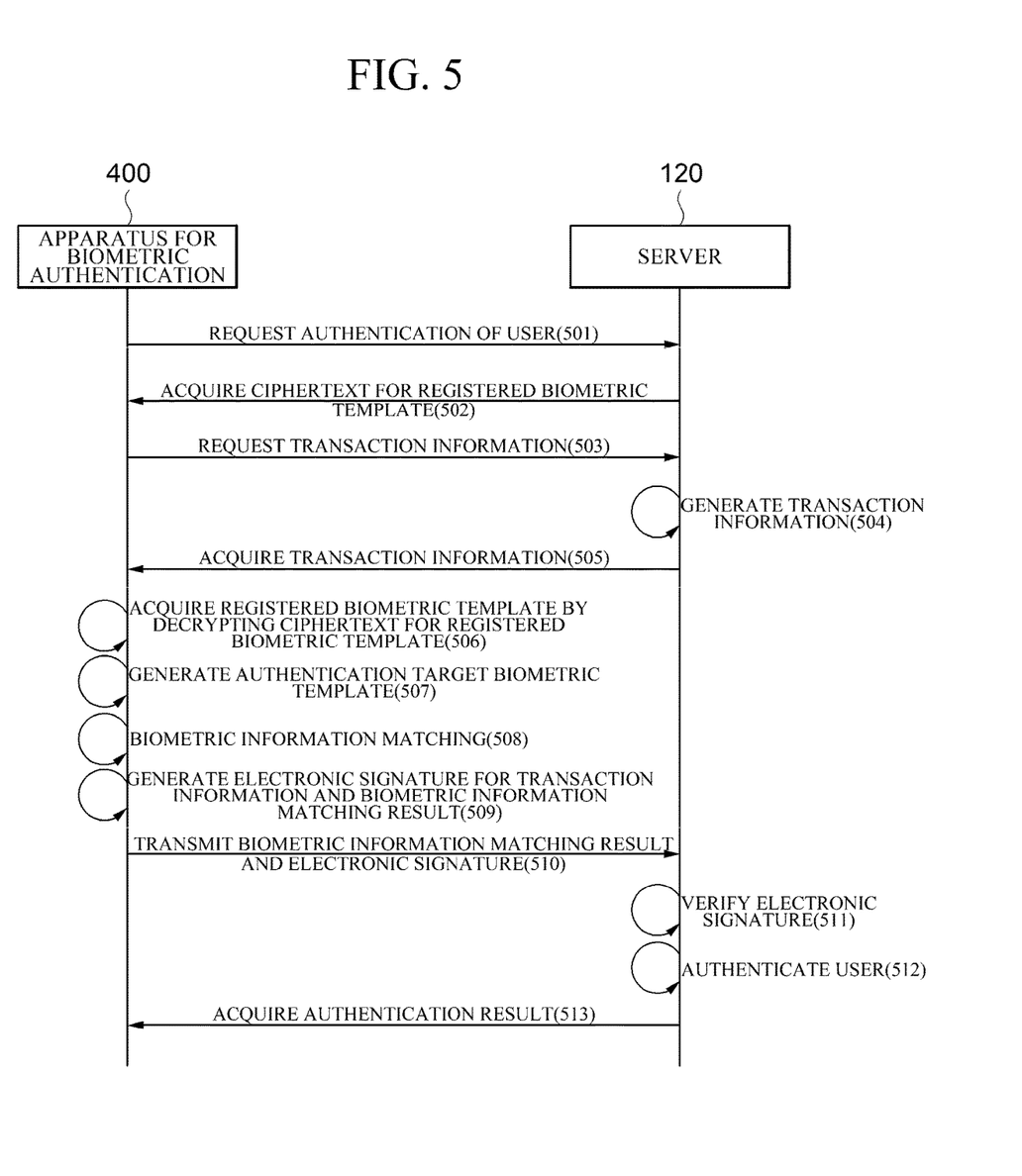
FIG. 5 is a flowchart illustrating a method of biometric authentication according to an additional embodiment.

FIG. 5 is a flowchart illustrating a method of biometric authentication according to an additional embodiment.

The method illustrated in FIG. 5 may be performed, for example, by the biometric authentication system 100 illustrated in FIG. 1.

Referring to FIG. 5, the apparatus 400 for biometric authentication requests the server 120 to authenticate a user (501).

Thereafter, the apparatus for biometric authentication may acquire ciphertext for a registered biometric template encrypted using the user's identification information from the server 120 (502).

Then, the apparatus 400 for biometric authentication may request the server 120 for transaction information (503).

Thereafter, the server 120 may generate transaction information based on the registered biometric template (504).

In this case, according to one embodiment, the transaction information may include hash information and random character information of the registered biometric template. In addition, according to one embodiment, the transaction information may further include information on the apparatus for biometric authentication and user information.

Thereafter, the apparatus 400 for biometric authentication may acquire the transaction information from the server 120 (505).

Then, the apparatus 400 for biometric authentication may acquire the registered biometric template by decrypting the ciphertext for the registered biometric template using the user's identification information (506).

According to one embodiment, the apparatus 400 for biometric authentication may decrypt the ciphertext for the registered biometric template using a symmetric key-based encryption algorithm, such as an AES algorithm, a DES algorithm, or the like, in which an encryption key for encrypting plaintext is the same as a decryption key of ciphertext encrypted using the corresponding encryption key.

Thereafter, the apparatus 400 for biometric authentication generates an authentication target biometric template based on the biometric information of the user (507).

Then, the apparatus 400 for biometric authentication performs biometric information matching based on the registered biometric template and the authentication target biometric template (508).

Thereafter, the apparatus 400 for biometric authentication may generate an electronic signature for the transaction information and the biometric information matching result using a private key (509).

Specifically, the apparatus 400 for biometric authentication may generate the electronic signature for the transaction information and the biometric information matching result using the private key of the apparatus 400 for biometric authentication.

Thereafter, the apparatus 400 for biometric authentication may transmit the electronic signature and the biometric information matching result to the server 120 (510).

Thereafter, the server 120 may verify the electronic signature for the transaction information and the biometric information matching result using a public key (511).

For example, the server 120 may verify the electronic signature for the transaction information and the biometric information matching result using the public key of the apparatus 400 for biometric authentication. That is, the apparatus 400 for biometric authentication and the server 120 generate and verify the electronic signature for the transaction information and the biometric information matching result using the private key and the public key of the apparatus 400, thereby verifying the apparatus 400 and the validity of the biometric information matching result.

Thereafter, the server 120 may authenticate the user based on the verification result for the electronic signature for the transaction information and the biometric information matching result (512).

In this case, according to one embodiment, the authentication result may be determined based on the verification result of the server 120 for the electronic signature using the public key that corresponds to the private key. For example, the server 120 may or may not authenticate the user based on the biometric information matching result and the success or failure of the electronic signature verification using the public key. Specifically, when the electronic signature verification is successful and at the same time the biometric information matching is successful, the server 120 may authenticate the user, and in the other cases, the server 120 may not authenticate the user.

Thereafter, the apparatus 400 for biometric authentication acquires the authentication result for the user based on the biometric information matching result (513).

Figure 6:
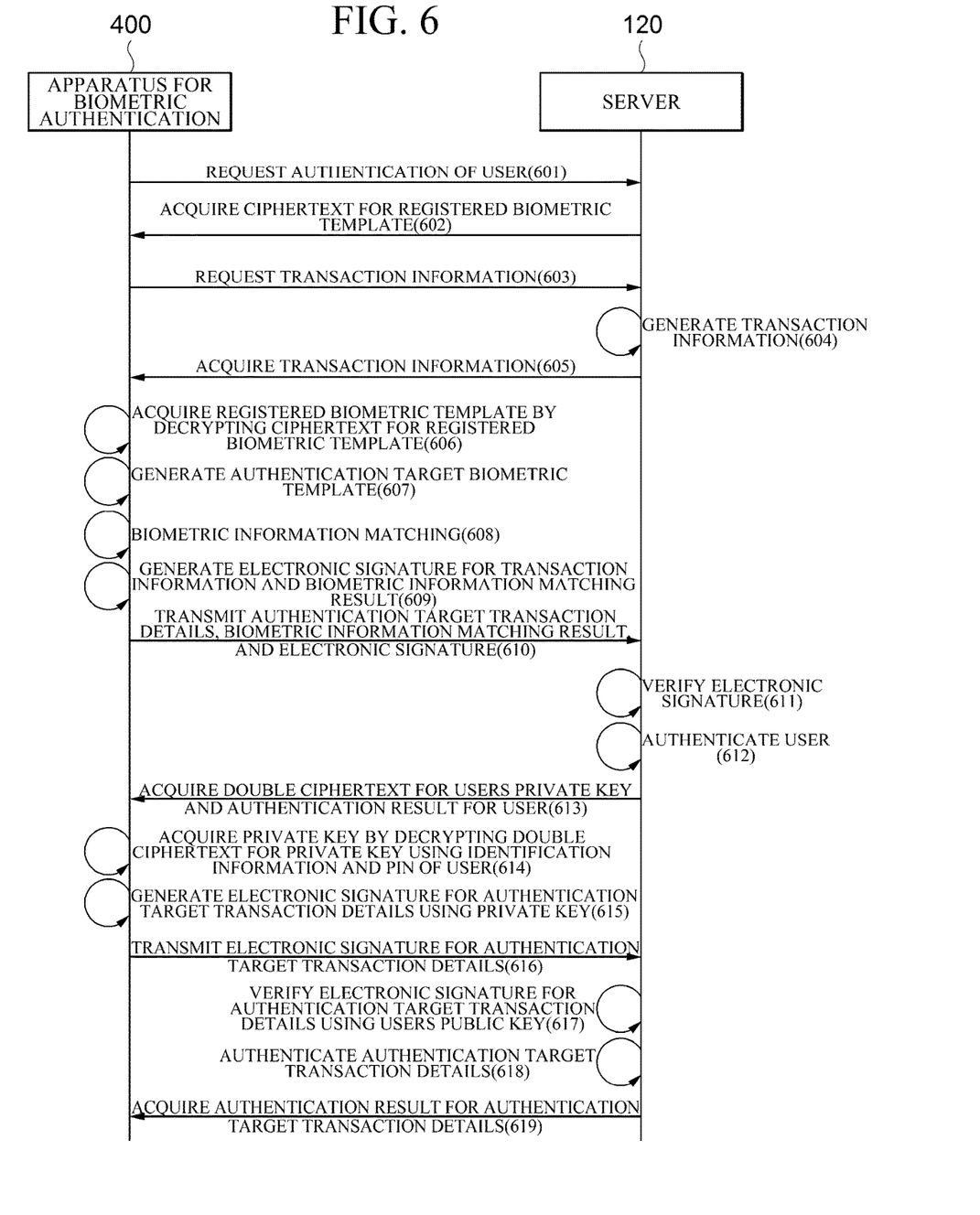
FIG. 6 is a flowchart illustrating a method of biometric authentication for transaction authentication according to one embodiment.

FIG. 6 is a flowchart illustrating a method of biometric authentication for transaction authentication according to one embodiment.

The method illustrated in FIG. 6 may be performed, for example, by the biometric authentication system 100 illustrated in FIG. 1.

Referring to FIG. 6, the apparatus 400 for biometric authentication requests the server 120 to authenticate a user (601).

Thereafter, the apparatus 400 for biometric authentication may acquire ciphertext for a registered biometric template using the user's identification information from the server 120 (602).

Then, the apparatus 400 for biometric authentication may request the server 120 for transaction information (603).

Thereafter, the server 120 may generate transaction information based on the registered biometric template (604).

Thereafter, the apparatus 400 for biometric authentication may acquire the transaction information from the server 120 (605).

Thereafter, the apparatus 400 for biometric authentication may acquire the registered biometric template by decrypting the ciphertext for the registered biometric template using the user's identification information (606).

Then, the apparatus 400 for biometric authentication generates an authentication target biometric template based on biometric information of the user (607).

Thereafter, the apparatus 400 for biometric authentication performs biometric information matching based on the registered biometric template and the authentication target biometric template (608).

Thereafter, the apparatus 400 for biometric authentication may generate an electronic signature for the transaction information and the biometric information matching result using a private key of the apparatus 400 for biometric authentication (609).

Thereafter, the apparatus 400 for biometric authentication may transmit authentication target transaction details, the electronic signature, and the biometric information matching result to the server 120 (610).

Thereafter, the server 120 may verify the electronic signature for the transaction information and the biometric information matching result using a public key of the apparatus 400 for biometric authentication (611).

Then, the server 120 may authenticate the user based on the verification result for the electronic signature for the transaction information and the biometric information matching result (612).

Thereafter, the apparatus 400 for biometric authentication acquires dual ciphertext for the user's private key and the authentication result for the user from the server 120 (613).

For example, when the electronic signature for the transaction information and the biometric information matching result is verified, the server 120 may transmit the double ciphertext for the user's private key to the apparatus 400 for biometric authentication.

Subsequently, the apparatus 400 for biometric authentication may acquire the user's private key by decrypting the double encryption text for the private key using the user's identification information and PIN (614).

Thereafter, the apparatus 400 for biometric authentication may generate an electronic signature for authentication target transaction details using the user's private key (615).

Then, the apparatus 400 for biometric authentication may transmit an electronic signature for the authentication target transaction details to the server 120 (616).

Thereafter, the server 120 may verify the electronic signature for the authentication target transaction details using the user's public key (617).

Then, when the electronic signature for the authentication target transaction details is verified, the server 120 may authenticate the authentication target transaction details (618).

Thereafter, the apparatus 400 for biometric authentication acquires the authentication result for the authentication target transaction details from the server 120 (619).

Figure 7:
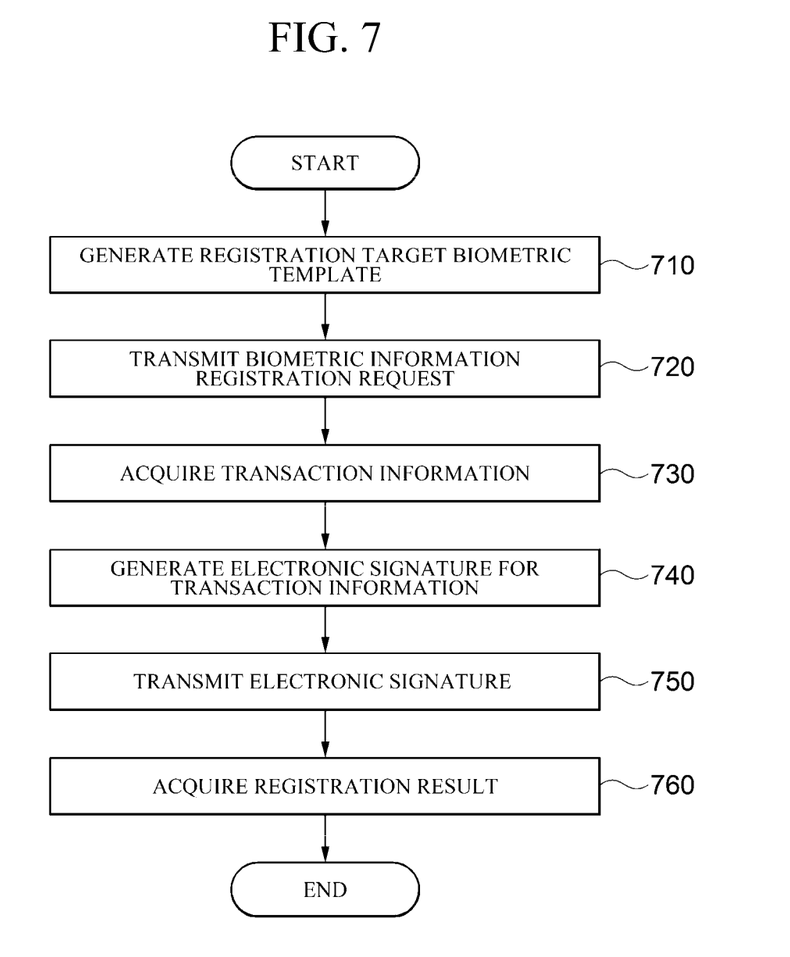
FIG. 7 is a flowchart illustrating a method of registering biometric information according to one embodiment.

FIG. 7 is a flowchart illustrating a method of registering biometric information according to one embodiment.

The method illustrated in FIG. 7 may be performed, for example, by the apparatus 200 for registering biometric information which is each terminal 110-1, 110-2, and 110-*n* illustrated in FIG. 1 or implemented as one configuration of each terminal 110-1, 110-2, and 110-*n*.

Referring to FIG. 7, the apparatus 200 for registering biometric information acquires a registration target biometric template based on biometric information of the user (710).

In this case, the apparatus 200 for registering biometric information may generate ciphertext for the registration target biometric template using the user's identification information.

Thereafter, the apparatus 200 for registering biometric information transmits a biometric information registration request including the registration target biometric template to the server 120 (720).

In this case, the apparatus 200 for registering biometric information may transmit the biometric information registration request including the ciphertext for the registration target biometric template to the server 120.

Then, the apparatus 200 for registering biometric information acquires transaction information based on the biometric information registration request from the server 120 (730).

In this case, the transaction information may include hash information and random character information for the registration target biometric template.

Thereafter, the apparatus 200 for registering biometric information generates an electronic signature for the transaction information using a private key (740).

Thereafter, the apparatus 200 for registering biometric information transmits the electronic signature for the transaction information to the server 120 (750).

Subsequently, the apparatus 200 for registering biometric information acquires the registration result for the registration target biometric template based on the verification result for the electronic signature for the transaction information from the server 120 (760).

In this case, the registration result may be determined based on the verification result of the server 120 for the electronic signature for the transaction information using a public key that corresponds to the private key.

Figure 8:
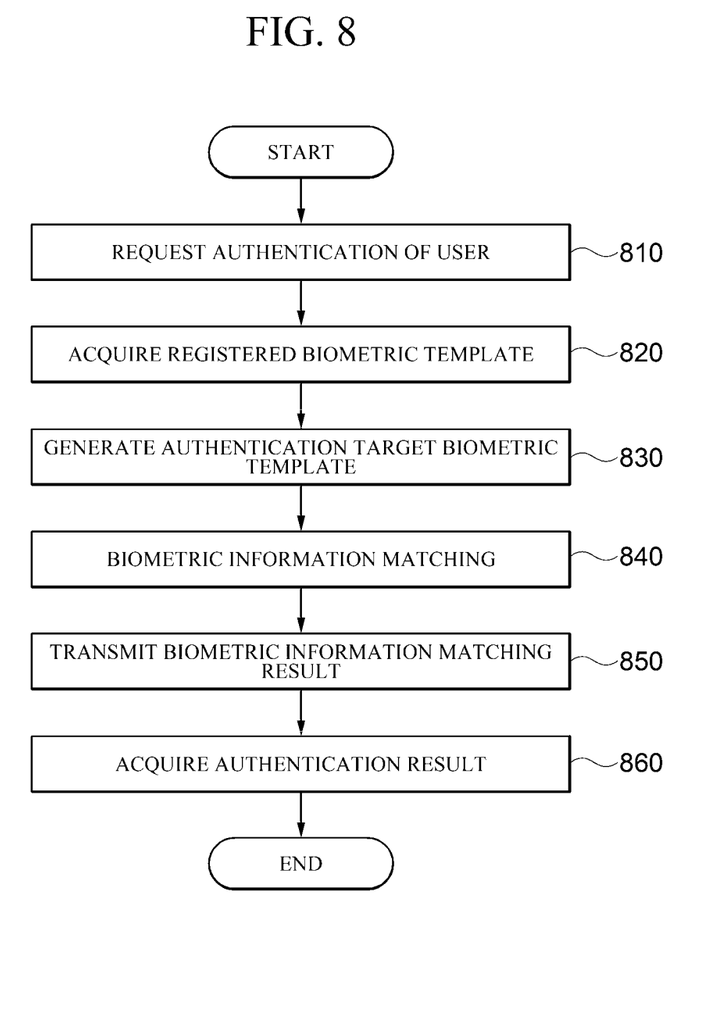
FIG. 8 is a flowchart illustrating a method of biometric authentication according to one embodiment

FIG. 8 is a flowchart illustrating a method of biometric authentication according to one embodiment.

The method illustrated in FIG. 8 may be performed, for example, by the apparatus 400 for biometric authentication which is each terminal 110-1, 110-2, and 110-*n* shown in FIG. 1 or implemented as one configuration of each terminal 110-1, 110-2, and 110-*n*.

Referring to FIG. 8, the apparatus 400 for biometric authentication requests the server 120 to authenticate a user (810).

Thereafter, the apparatus 400 for biometric authentication acquires a pre-registered biometric template of the user from the server 120 (820).

In this case, the apparatus 400 for biometric authentication may acquire ciphertext for the registered biometric template encrypted using the user's identification information from the server 120.

In addition, the apparatus 400 for biometric authentication may acquire the registered biometric template by decrypting the ciphertext for the registered biometric template using identification information.

Also, the apparatus 400 for biometric authentication may acquire transaction information from the server 120.

In this case, the transaction information may include hash information and random character information of the registered biometric template.

Thereafter, the apparatus 400 for biometric authentication acquires an authentication target biometric template from the user (830).

Then, the apparatus 400 for biometric authentication performs biometric information matching based on the registered biometric template and the authentication target biometric template (840).

Thereafter, the apparatus 400 for biometric authentication transmits the biometric information matching result to the server 120 (850).

In this case, the apparatus 400 for biometric authentication may generate an electronic signature for the transaction information and the biometric information matching result using a private key.

Also, the apparatus 400 for biometric authentication may transmit the electronic signature and the biometric information matching result to the server 120.

Thereafter, the apparatus 400 for biometric authentication acquires the authentication result for the user based on the biometric information matching result from the server 120 (860).

In this case, the authentication result may be determined based on the verification result of the server 120 for the electronic signature for the transaction information and the biometric information matching result using a public key that corresponds to the private key.

Meanwhile, in the flowcharts illustrated in FIGS. 7 and 8, the method is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

Figure 9:
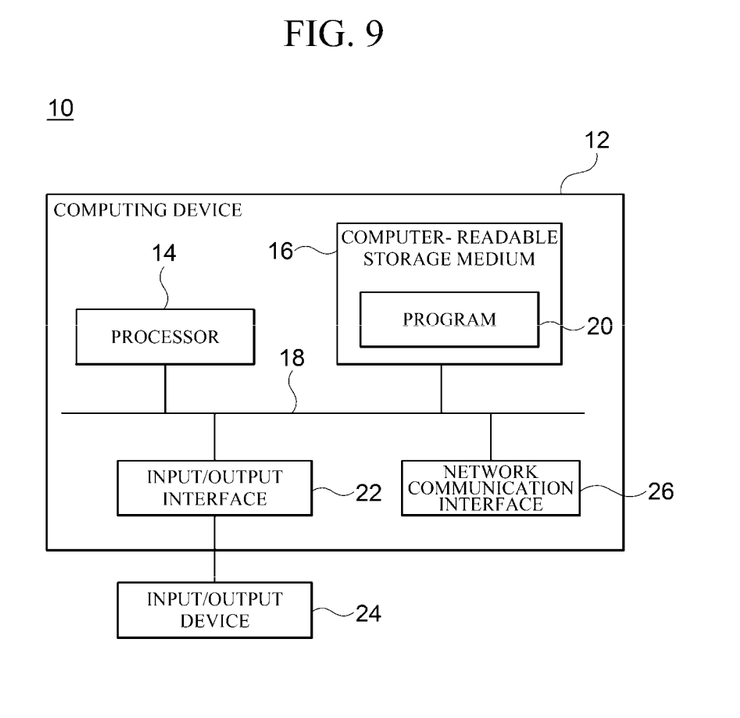
FIG. 9 is a block diagram for describing an example of a computing environment including a computing device suitable for use in exemplary embodiments.

FIG. 9 is a block diagram for describing an example of a computing environment including a computing device suitable for use in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be, for example, one or more components included in the apparatus 200 for registering biometric information which is each terminal 110-1, 110-2, and 110-*n* shown in FIG. 1 or implemented as one configuration of each terminal 110-1, 110-2, and 110-*n*. In addition, in one embodiment, the computing device 12 may be, for example, one or more components included in the apparatus 400 for biometric authentication which is each terminal 110-1, 110-2, and 110-*n* shown in FIG. 1 or implemented as one configuration of each terminal 110-1, 110-2, and 110-*n*.

The computing device 12 may include at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable instructions, and the computer executable instructions may be configured to, when executed by the processor 14, cause the computing device 12 to perform operations according to the exemplary embodiment.

The computer-readable storage medium 16 is configured to store computer executable instructions and program codes, program data and/or information in other suitable forms. The programs stored in the computer-readable storage medium 16 may include a set of instructions executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer-readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the disclosed embodiments, biometric information matching is performed in the terminal, thereby preventing the hassle of retransmitting biometric information to the server when the biometric information matching fails.

In addition, according to the disclosed embodiments, the biometric information matching result is verified using the terminal's private key and public key, thereby allowing the server to trust the biometric information matching result of the terminal.

Further, according to the disclosed embodiments, the biometric information of the user is encrypted using the user's identification information, thereby safely protecting the user's biometric information.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for registering biometric information, comprising:
   one or more processors; and
   one or more network communication interfaces,
   wherein the one or more processors are configured to:
      generate a registration target biometric template based on biometric information of a user;
      transmit a biometric information registration request including the registration target biometric template to a server through the one or more network communication interfaces;
      acquire transaction information based on the biometric information registration request from the server through the one or more network communication interfaces;
      generate an electronic signature for the transaction information using a private key;
      transmit the electronic signature for the transaction information to the server through the one or more network communication interfaces; and
      acquire a registration result for the registration target biometric template based on a verification result for the electronic signature from the server through the one or more communication interface,
   wherein the transaction information includes hash information and random character information for the registration target biometric template.

2. The apparatus of claim 1, wherein the one or more processors are further configured to generate ciphertext for the registration target biometric template using identification information of the user and transmit the biometric information registration request including the ciphertext to the server through the one or more network communication interfaces.

3. The apparatus of claim 1, wherein the registration result is determined based on the verification result of the server for the electronic signature using a public key that corresponds to the private key.

4. A method of registering biometric information, comprising:
   generating a registration target biometric template based on biometric information of a user;
   transmitting a biometric information registration request including the registration target biometric template to a server;
   acquiring transaction information based on the biometric information registration request from the server through one or more communication interfaces;
   generating an electronic signature for the transaction information using a private key;
   transmitting the electronic signature for the transaction information to the server through the one or more communication interfaces; and
   acquiring a registration result for the registration target biometric template based on a verification result for the electronic signature from the server through the one or more communication interface,
   wherein the transaction information includes hash information and random character information for the registration target biometric template.

5. The method of claim 4, wherein the transmitting of the biometric information registration request comprises generating ciphertext for the registration target biometric template using identification information of the user and transmitting the biometric information registration request including the ciphertext to the server through the one or more communication interfaces.

6. The method of claim 4, wherein the registration result is determined based on the verification result of the server for the electronic signature using a public key that corresponds to the private key.

7. An apparatus for biometric authentication, comprising:
   one or more processors; and
   one or more network communication interfaces,
   wherein the one or more processors are configured to:
   request a server to authenticate a user through the one or more network communication interfaces;
   acquire a registered biometric template of the user from the server, which has pre-registered the biometric template, through the one or more network communication interfaces;
   acquire transaction information from the server through the one or more network communication interfaces;
   generate an authentication target biometric template based on biometric information of the user;
   perform biometric information matching based on the registered biometric template and the authentication target biometric template;
   transmit a biometric information matching result to the server through the one or more network communication interfaces; and
   acquire an authentication result for the user based on the biometric information matching result from the server through the one or more network communication interfaces,
   wherein the one or more processors are further configured to generate an electronic signature for the transaction information and the biometric information matching result using a private key and transmit the biometric information matching result and the electronic signature to the server through the one or more network communication interfaces.

8. The apparatus of claim 7, wherein the one or more processors are further configured to acquire ciphertext for the registered biometric template, which is encrypted using identification information of the user, from the server through the one or more network communication interfaces and acquire the registered biometric template by decrypting the ciphertext using the identification information.

9. The apparatus of claim 7, wherein the transaction information includes hash information and random character information for the registered biometric template.

10. The apparatus of claim 7, wherein the authentication result is determined based on a verification result of the server for the electronic signature using a public key that corresponds to the private key.

11. A method of biometric authentication, comprising:
requesting a server to authenticate a user;
acquiring a registered biometric template of the user from the server, which has pre-registered the biometric template;
acquiring transaction information from the server;
generating an authentication target biometric template based on biometric information of the user;
performing biometric information matching based on the registered biometric template and the authentication target biometric template;
transmitting a biometric information matching result to the server; and
acquiring an authentication result for the user based on the biometric information matching result from the server, wherein the transmitting of the biometric information matching result comprises generating an electronic signature for the transaction information and the biometric information matching result using a private key and transmitting the biometric information matching result and the electronic signature to the server.

12. The method of claim 11, wherein the acquiring of the registered biometric template comprises acquiring ciphertext for the registered biometric template, which is encrypted using identification information of the user, from the server and acquiring the registered biometric template by decrypting the ciphertext using the identification information.

13. The method of claim 11, wherein the transaction information includes hash information and random character information for the registered biometric template.

14. The method of claim 11, wherein the authentication result is determined based on a verification result of the server for the electronic signature using a public key that corresponds to the private key.

* * * * *